(12) United States Patent
DiVerdi et al.

(10) Patent No.: US 8,335,675 B1
(45) Date of Patent: Dec. 18, 2012

(54) REALISTIC REAL-TIME SIMULATION OF NATURAL MEDIA PAINTS

(75) Inventors: Stephen J. DiVerdi, Mountain View, CA (US); Sunil Hadap, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 786 days.

(21) Appl. No.: 12/395,261

(22) Filed: Feb. 27, 2009

(51) Int. Cl.
*G06F 7/60* (2006.01)
*G06G 7/48* (2006.01)
*G06G 7/50* (2006.01)

(52) U.S. Cl. .......... 703/9; 703/2; 703/6; 434/81; 434/84

(58) Field of Classification Search .......... 703/2, 6, 703/9; 434/81, 84
See application file for complete search history.

(56) References Cited

U.S. PATENT DOCUMENTS

| | | | | |
|---|---|---|---|---|
| 5,432,896 A * | 7/1995 | Hwong et al. | | 345/592 |
| 5,828,819 A * | 10/1998 | Do et al. | | 345/604 |
| 5,877,777 A * | 3/1999 | Colwell | | 345/473 |
| 6,171,656 B1 * | 1/2001 | Settles | | 427/294 |
| 6,198,489 B1 | 3/2001 | Salesin et al. | | |
| 6,266,071 B1 * | 7/2001 | Stam et al. | | 345/473 |
| 6,486,886 B1 * | 11/2002 | Silverbrook et al. | | 345/584 |
| 6,515,675 B1 * | 2/2003 | Bourdev | | 345/629 |
| 6,674,485 B2 * | 1/2004 | Akiyama et al. | | 348/586 |
| 6,765,589 B1 * | 7/2004 | Georgiev et al. | | 345/646 |
| 6,894,704 B1 * | 5/2005 | Bourdev et al. | | 345/629 |
| 7,098,932 B2 * | 8/2006 | Georgiev et al. | | 345/647 |
| 7,256,798 B2 * | 8/2007 | Bourdev et al. | | 345/619 |
| 7,262,782 B1 * | 8/2007 | Parenteau et al. | | 345/629 |
| 7,312,805 B1 * | 12/2007 | Worthington | | 345/647 |
| 7,539,606 B2 * | 5/2009 | Comair et al. | | 703/9 |
| 7,565,276 B2 | 7/2009 | Song et al. | | |
| 7,567,263 B2 * | 7/2009 | Georgiev et al. | | 345/647 |
| 7,583,276 B1 * | 9/2009 | Worthington | | 345/647 |
| 7,692,652 B2 * | 4/2010 | Parenteau et al. | | 345/426 |
| 7,921,003 B2 * | 4/2011 | Miller et al. | | 703/9 |
| 2003/0060988 A1 | 3/2003 | Ginzburg | | |
| 2004/0230411 A1 | 11/2004 | Zheng et al. | | |
| 2005/0106328 A1 * | 5/2005 | Moore et al. | | 427/421.1 |
| 2009/0157366 A1 * | 6/2009 | Shin et al. | | 703/9 |

OTHER PUBLICATIONS

Beets et al. "Introducing Artistic Tools in an Interactive Paint System", Jan. 2006.*

(Continued)

*Primary Examiner* — Shambhavi Patel
(74) *Attorney, Agent, or Firm* — Robert C. Kowert; Meyertons, Hood, Kivlin, Kowert & Goetzel, P.C.

(57) ABSTRACT

A method, system, and computer-readable storage medium are disclosed for simulating paint behavior. In one embodiment, input representing a deposition of a first type of paint and a second type of paint on a canvas may be received. The first type of paint has a first set of fluid properties, and the second type of paint has a second set of fluid properties differing from the first set. In one embodiment, a motion of the first type of paint and the second type of paint on the canvas may be simulated dependent on the respective sets of fluid properties. The simulated motion of the second type of paint differs from the simulated motion of the first type of paint. An effect of the deposition of the paint may be determined dependent on the simulation. An image representing the effect of the deposition of the paint may be displayed.

34 Claims, 6 Drawing Sheets

OTHER PUBLICATIONS

Van Laerhoven et al. "Real-Time Simulation of Watery Paints", Sep. 2005.*
Small, David. "Modeling Watercolor by Simulating Diffusion, Pigment, and Paper Fibers", Nov. 2007.*
Bauer, Andreas. "InkPlay: Watercolour Simulation using the Lattice Boltzmann Method for Two-Dimensional Fluid Dynamics", Sep. 2005.*
Goktekin et al. "A Method for Animating Viscoelastic Fluids", Computer Graphics Proceedings, Annual Conference Series, 2004.*
Baxter, William. "Physically-Based Modeling Techniques for Interactive Digital Painting", Nov. 2004.*
Baxter et al. "A Viscous Paint Model for Interactive Applications", 2003.*
Baxter et al. "DAB: Interactive Haptic Painting with 3D Virtual Brushes", 2001.*
Corel Painter X User Guide, 2006.*
O'Brien, Patrick. "A Framework for Digital Watercolor", 2008.*
Baxter et al. "IMPaSTo: A Realistic, Interactive Model for Paint", 2004.*
Siu-Hang Chu, "Making Digital Painting Organic," PhD thesis, Hong Kong University of Science and Technology, Aug. 2007, Hong Kong.
Nelson S.-H. Chu and Chiew-Lan Tai, "MoXi: Real-Time Ink Dispersion in Absorbent Paper," ACM Transactions on Graphics (TOG), vol. 24, Issue 3 (Jul. 2005), Proceedings of ACM SIGGRAPH 2005, pp. 504-511.
Wei Li, Zhe Fan, Xiaoming Wei, and Arie Kaufman, "GPU-Based Flow Simulation with Complex Boundaries," Technical Report 031105, Nov. 2003, Computer Science Department, SUNY at Stony Brook, Stony Brook, NY.
Tom Van Laerhoven, et al., "Real-time watercolor painting on a distributed paper model," Proceedings of Computer Graphics International 2004, Jun. 2004, pp. 640-643.
William V. Baxter III, "Physically-based Modeling Techniques forInteractive Digital Painting." PhD thesis, University of North Carolina, Jun. 2004, Chapel Hill, NC.
Naoto Okaichi, "Interactive Oil Painting Simulation with Virtual Painting Knives" PhD thesis, University of Tokyo, Feb. 2008, Tokyo.
Jos Stam, "Stable Fluids," SIGGRAPH 99 Conference Proceedings, Aug. 1999, pp. 121-128, ACM Press, New York, NY.
Simon Clavet, Philippe Beaudoin, and Pierre Poulin, "Particle-based Viscoelastic Fluid Simulation," ACM SIGGRAPH Symposium on Computer Animation 2005, pp. 219-228, Jul. 2005.
Tolga G. Goktekin, Adam W. Bargteil, and James F. O'Brien, "A Method for Animating Viscoelastic Fluids," ACM Transactions on Graphics (Proc. of ACM SIGGRAPH 2004), vol. 23, Aug. 2004, pp. 463-467.
Tom Van Laerhoven, "An Extensible Simulation Framework Supporting Physically-based Interactive Painting," PhD thesis, University of Limburg, Jun. 2006, Maastricht, Netherlands.
U.S. Appl. No. 12/469,572, filed May 20, 2009.
Lenaerts, et al, "Porous Flow in Particle-Based Fluid Simulations," ACM SIGGRAPH '08, Aug. 2008, pp. 49:1-49:8.
Zhao, et al., "Flow Simulation with Locally-Refined LBM," ACM, Proceedings of the 2007 Symposium on Interactive 3D Graphics and Games, Apr. 2007, pp. 181-188.
Cox, et al., "Sound Propagation in a Shallow Water Region Overlying a Viscoelastic Halfspace," IEEE OCEANS 80, 1980, pp. 127-131.
Sameh, et al., "Large Scale Simulation of Particulate Flows," IEEE 13th International Conference and 10th Symposium on Parallel and Distributed Processing, 1999, pp. 660-666.
Ng, "Mass Transport in a Layer of Power-Law Fluid Forced by Periodic Surface Pressure," Sciencedirect, vol. 39, No. 3, Mar. 2004, pp. 241-259.
Chen, et al., "Lattice Boltzmann Method for Fluid Flows," Annual Review of Fluid Mechanics, vol. 30. 1998, pp. 329-364.

* cited by examiner

REALISTIC REAL-TIME SIMULATION OF NATURAL MEDIA PAINTS

BACKGROUND

Description of Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, paths, polygons, Bezier curves, and text characters) may be based upon mathematical equations to represent parts of vector graphics data in digital images. The geometric objects may typically be located in two-dimensional or three-dimensional space. A three-dimensional object may be represented in two-dimensional space for the purposes of displaying or editing the object.

An operation often provided by a digital image editor is the deposition of virtual "paint" onto a virtual "canvas." Paint is a fluid, and the deposition of virtual paint may involve fluid simulation techniques. Fluid simulation techniques in computer graphics are often concerned with solving the Navier-Stokes equations for inviscid, incompressible fluid flow. The fluid domain may be treated as an n-D (e.g., 2D or 3D) grid of density values. The fluid may be evolved by computing forces applied on each cell, advecting the quantity of fluid in each cell based on its velocity, diffusing each cell, and projecting the result to be divergence-free. The projection step typically requires simultaneously solving a sparse system of equations over the entire fluid domain. Thus, the projection step is a global computation using a sparse solver. However, sparse solvers may be inappropriate for parallelization, including highly parallel hardware such as graphical processing units (GPUs). Furthermore, the stable simulation of both inviscid and viscous fluids may require an expensive implicit solver. The use of such an expensive solver may be undesirable for high resolution, real-time simulations.

SUMMARY

Various embodiments of systems, methods, and computer-readable storage media for simulating paint behavior are disclosed. In one embodiment, input representing a deposition of a first type of paint on a canvas may be received. The first type of paint has a first set of fluid properties. Input representing a deposition of a second type of paint on the canvas may also be received. The second type of paint has a second set of fluid properties differing from the first set of fluid properties. For example, each set of fluid properties may comprise a respective viscosity and a respective surface tension.

In one embodiment, a motion of the first type of paint and a motion of the second type of paint on the canvas may be simulated. The motion of the first type of paint on the canvas is dependent on the first set of fluid properties, and the motion of the second type of paint on the canvas is dependent on the second set of fluid properties. The motion of the second type of paint may differ from the motion of the first type of paint due to the differences in the respective fluid properties. For example, simulating the motion of the first type of paint may comprise simulating a motion of a watercolor, and simulating the motion of the second type of paint may comprise simulating a motion of an oil paint. In one embodiment, the motion of the first type of paint and the motion of the second type of paint may be simulated simultaneously on the same canvas.

In one embodiment, an effect of the deposition of the first type of paint and the second type of paint on the canvas may be determined. The determined effect may be dependent on the simulated motion of the first type of paint and the simulated motion of the second type of paint on the canvas. In one embodiment, an image representing the effect of the deposition of the first type of paint and the second type of paint may be displayed (e.g., on a display device).

Figure 1:
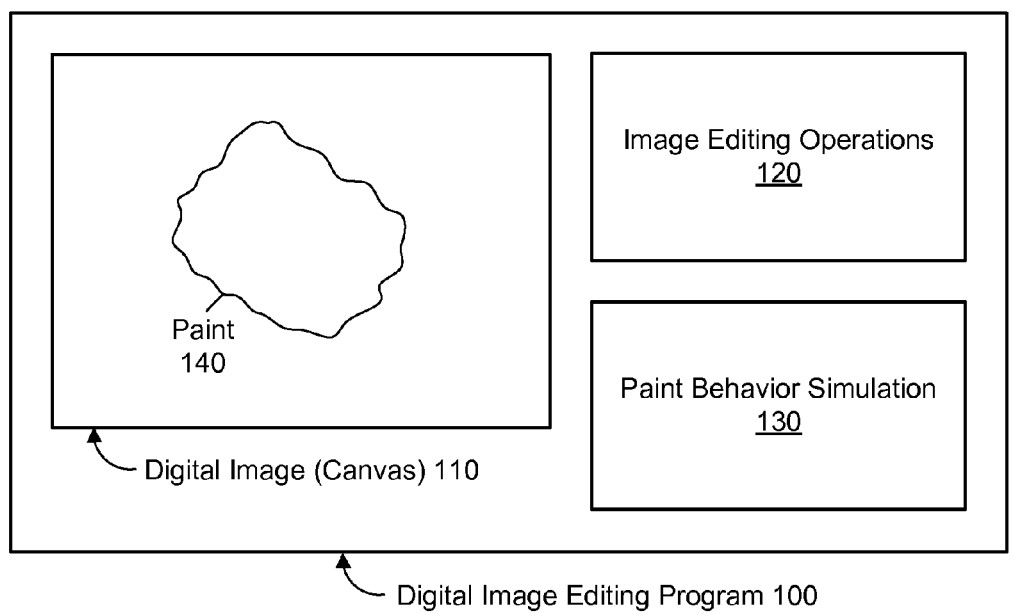
FIG. 1 is a block diagram illustrating an embodiment of a digital image editing program configured for the simulation of paint behavior.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Using embodiments of the systems and methods described herein, realistic behavior of paint may be simulated on a computer system. In one embodiment, the behavior of a wide range of natural paint media may be simulated realistically. In one embodiment, the behavior of the natural paint media may be simulated in real-time (e.g., in response to user input to deposit the paint onto a virtual canvas in a painting application). In one embodiment, the behavior of the natural paint media may be simulated at a high resolution.

FIG. 1 is a block diagram illustrating an embodiment of a digital image editing program 100 configured for use with the paint simulation techniques described herein. A digital image editing program 100, also referred to herein as an image editor 100, may be used to create and/or modify a digital image 110, also referred to herein as an image 110. The digital image editing program 100 may comprise a plurality of editing operations 120. The editing operations 120 may comprise suitable operations for modifying elements of the image 110. For example, various effects such as filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to one or more images, selections within the image 110, or other suitable data related to the image 110. In one embodiment, a suitable product such as Adobe Photoshop®, Adobe Illustrator®, or Adobe AfterEffects® (available from Adobe Systems, Inc.) may be used as the image editor 100.

Using the image editor 100, a user may seek to apply paint 140 (e.g., represented by pixel colors and transparency values) to the digital image 110. The digital image 110 may also be referred to herein as a "canvas." For example, the user may desire to paint portions of the image 110 using a paintbrush provided by the editing operations 120 of the image editor 100. In one embodiment, the digital image editing program 100 may comprise a brush model that is used to model such a paintbrush. The digital image editing program 100 may also comprise instructions to simulate brush behavior. The behavior of the paint 140 applied to the digital image (e.g., deposited using the brush model and the simulated brush behavior) may be simulated using paint behavior simulation functionality 130 (also referred to herein as paint simulation functionality 130).

The paint simulation functionality 130 may comprise program instructions executable on a computer system adapted for paint simulation. The program instructions may be executable using a central processing unit (CPU) and/or graphics processing unit (GPU). In one embodiment, the output of the paint simulation functionality 130 may be based, in part, on user input. The user input may be used to selected parameters such as the location of the paint 140 within the digital image 110, the color(s) of the paint 140, and the natural media type of the paint 140 (e.g., watercolor, oil paint, etc.). Various parameters used in the paint simulation functionality 130 may also be selected automatically or by retrieving default values.

As will be described in greater detail below, the paint simulation functionality 130 may comprise a fluid simulation. In one embodiment, the fluid simulation may be computed using the lattice Boltzmann method (LBM) with shallow water wave equations and amended to account for viscoelasticity. In one embodiment, use of the LBM may allow for acceleration of the simulation using a graphics processing unit (GPU). Acceleration using the GPU may enable real-time performance on screen-resolution (e.g., 1 megapixel) grids. The shallow water wave equations may be used to simulate a thickness of paint at each pixel, e.g., to capture 3D effects across the paint surface. The addition of a viscoelastic force term may allow elastic properties (i.e., shape retention) to be incorporated in the simulation. In one embodiment, a wide range of types of natural media, from watercolors to oil paints, may be simulated interactively and at high resolution. Flow across the surface of the canvas and flow through the canvas media may both be simulated, thereby further extending the variety of natural media effects that can be simulated in a single unified framework.

The process of painting with natural media may comprise a series of stages. Each stage may be simulated independently to result in a realistic digital reproduction of the real-world painting experience. A first stage may involve the changing shape of the brush tip during a stroke, thereby determining where paint is deposited. A second stage may involve the exchange of paint between the brush tip and the canvas. A third stage may involve the motion of paint that has been deposited on the canvas. Systems and methods for simulating the third stage are described herein.

In one embodiment, the behavior of a wide range of natural paint media, including watercolors and oil paints, may be simulated realistically. As used herein, the term "canvas" may refer to any painting surface, regardless of its material. Watercolors comprise a pigment suspended in regular water; the fluid is thin and inviscid. When watercolors are deposited on a fibrous canvas, the water is absorbed by the canvas and disperses over a larger area gradually due to capillary action. This type of fluid flow that occurs in the medium of the canvas is referred to as "media flow." Alternately, a hard non-porous canvas typically will not absorb the fluid, and droplets of water may therefore coalesce on the surface due to surface tension. This flow is referred to as "surface flow." Media flow is responsible for most of the characteristic traits of watercolor, such as the branching patterns and feathering of edges. In contrast to watercolors, oil paints comprise a pigment suspended in a medium such as linseed oil, which is thick and viscous. Oil paint deposited onto a canvas is not absorbed by the canvas, but remains on the surface; that is, oil paints exhibit surface flow but not media flow. Therefore, all of the characteristic traits of oil paint may result from the surface flow of the paint.

The important characteristics of media flow may include capillary action (i.e., the tendency of fluid to diffuse throughout media) and variable permeation (i.e., the fluid does not flow with uniform speed in all directions because the fibers of the media create pockets and barriers). In contrast, the important characteristics of surface flow may include diffusion due to gravity (i.e., bubbles tend to thin and spread out), surface tension (i.e., droplets form bubbles rather than becoming infinitely thin), and viscoelasticity (i.e., some fluids retain surface texture). Capillary action and gravity diffusion may often be modeled the same way, as the fluid's natural tendency to diffuse. Variable permeation, surface tension, and viscoelasticity are discussed further below.

Watercolors are an example of a totally plastic material. As used herein, the term "plastic" describes the behavior that the material deforms when forces are applied, and the material maintain the deformed shape after the force is gone; that is, the deformation is essentially permanent. A plastic material can be viscous, like honey, or inviscid, like water. In either case, forces such as gravity may gradually change the shape of the material, though at different speeds. For example, for both a cube of water and a cube of honey, the force of gravity will cause the cubes to flatten and spread over time until surface tension and gravity reach an equilibrium and they achieve roughly the same shape, though at very different speeds.

The opposite of plastic is elastic. An elastic material (e.g., rubber) may deform when forces are applied, but once the forces are gone, the original shape may be restored automatically; that is, the deformation is temporary. As used herein, the term "elastic flow" describes this temporary deformation, and the term "plastic flow" describes a permanent deformation.

As used herein, the term "viscoelastic" describes a material that exhibits both plastic and elastic properties. Under small forces, a viscoelastic material flows elastically (i.e., deformation is temporary). Under larger forces, the flow is plastic (i.e., deformation is permanent). Oil paint is an example of a viscoelastic material. Unlike viscous fluids such as honey, oil paint will retain its surface texture after the brush has finished stroking it. This effect is often important for the creation of the expected texture and paint-buildup features of oil paintings. Because oil paint is viscoelastic, it will retain its surface shape indefinitely under normal forces such as gravity.

The Boltzmann equation describes probabilistically the motion of individual particles. The lattice Boltzmann equation discretizes the Boltzmann equation onto a lattice or regular grid. The lattice Boltzmann method (LBM) is an algorithm for simulating the motion of a fluid that works by repeatedly evaluating the Boltzmann equation on a regular grid. In contrast to other fluid simulation approaches, each grid cell of the fluid is considered in isolation using the LBM; that is, the calculations are entirely local, without the need for a global solve step. Therefore, the LBM approach may be parallelizable with only local information and suitable for GPU acceleration.

In one embodiment, the LBM tracks the probabilistic distribution of fluid among a set of velocities. In a two-dimensional (2D) simulation, for each cell, 9 bins may be stored. Each bin may represent the amount of fluid traveling in one of 8 cardinal directions (i.e., N, NE, E, SE, S, SW, W, NW) or stationary. The total amount of fluid in the cell is the sum of the 9 bins. The total amount of fluid may be represented using Equation 1:

$$f_i(x,t) \tag{1}$$

where x is a grid cell, t is a moment in time, and $f_i(x, t)$ is the portion of fluid in bin i in cell x at time t. Equations 2 and 3 follow:

$$\rho = \sum_i f_i \tag{2}$$

$$u = \sum_i e_i \cdot f_i \tag{3}$$

where $\rho(x, t)$ is the density of the fluid at the grid cell and time, $u(x, t)$ is the velocity, and $e_i$ is the velocity vector associated with each bin i over unit time (i.e., one grid cell in the appropriate direction). Note that in equations where all the x and t parameters are the same, these variables may be omitted for brevity.

In one embodiment, the LBM may proceed in two steps. The first step may be referred to as streaming and may be represented as Equation 4:

$$f_i^*(x+e_i, t+dt) = f_i(x,t) + F_i(x,t) \tag{4}$$

where dt is a timestep and $F_i$ is the component of an external force applied to the fluid along the direction of the i-th bin. The streaming step simulates the unimpeded motion of particles of the fluid over time. Without obstruction, they will move in the direction of their velocity.

However, other particles typically get in the way, resulting in collisions. The simulation of the collisions is the second step of LBM and may be represented by Equation 5:

$$f_i = f_i^* + \Omega_i \tag{5}$$

where $\Omega(x, t)$ is the collision operator that computes the change in distribution of the grid cell. The value $\Omega$ may be computed locally, using only the values at the grid cell to compute an equilibrium distribution, and then gradually relax towards that distribution.

In various embodiments, different collision operators may be used. For example, a common collision operator is Bhatnagar-Gross-Krook (BGK) for Newtonian fluids, which may be defined as Equation 6:

$$\Omega_i = -\frac{1}{\tau}(f_i^* - f_i^{eq}(\rho, u)) \tag{6}$$

where $\tau$ is a relaxation parameter that determines how quickly equilibrium is achieved and $f_{eq}(\rho, u)$ is the equilibrium distribution at the cell. The value $f_{eq}$ is a function of the macroscopic properties of the cell, that is, the density and velocity of the fluid, and it represents the ideal distribution of fluid amongst the bins for that fluid density and velocity. Different forms of $f^{eq}$ may represent different sets of behaviors for the fluid. For the Navier-Stokes equations for incompressible flow, $f_{eq}$ may be defined as Equation 7:

$$f_i^{eq}(\rho, u) = \frac{4}{9}\rho\left(1 - \frac{3}{2}u \cdot u\right), \quad i = 0 \qquad (7)$$
$$= \frac{1}{9}\rho\left(1 + 3e_i \cdot u + \frac{9}{2}(e_i \cdot u)^2 - \frac{3}{2}u \cdot u\right), \quad i \in \{1, 2, 3, 4\}$$
$$= \frac{1}{36}\rho\left(1 + 3e_i \cdot u + \frac{9}{2}(e_i \cdot u)^2 - \frac{3}{2}u \cdot u\right), \quad i \in \{5, 6, 7, 8\}$$

where i=0 is the stationary bin, i∈{1, 2, 3, 4} are horizontal and vertical bins, and i∈{5, 6, 7, 8} are the diagonal bins.

Typically, fluid simulations solve for a density value per cell in an entire area (2D) or volume (3D), such as by using the conventional Navier-Stokes equations. To create the three-dimensional (3D) surface of a painting, a full 3D simulation may be necessary using the conventional. Navier-Stokes approach. However, a reasonable simplification of the paint surface may represent the surface as 2.5D. In this approach, the representation of the paint surface may include a height field that may be represented as a 2D array of height values. A limited set of 3D shapes may be represented by a height field. In one embodiment, for example, the surface cannot overlap itself because there cannot be multiple heights per cell. This limitation is sufficient to represent almost all paintings, and even in cases where the 2.5D approach cannot exactly reproduce a painting surface, the error will be small.

The conventional Navier-Stokes formulation of the LBM for incompressible fluids includes a standard set of equations for computing $f^{eq}$ (i.e., Equation 7). In order to simulate the shallow water wave equations instead, the $f_{eq}$ equations may be slightly modified. Instead of tracking the density (ρ) of each cell, the height (h) of each cell may instead be used. Therefore, $f_{eq}$ may be defined as Equation 8:

$$f_i^{eq}(h, u) = h\left(1 - \frac{5}{6}gh - \frac{2}{3}u \cdot u\right), \quad i = 0 \qquad (8)$$
$$= \frac{1}{6}h(gh + 2e_i \cdot u + 3(e_i \cdot u)^2 - u \cdot u), \quad i \in \{1, 2, 3, 4\}$$
$$= \frac{1}{24}h(gh + 2e_i \cdot u + 3(e_i \cdot u)^2 - u \cdot u), \quad i \in \{5, 6, 7, 8\}$$

where g is the force of gravity in the z direction.

In one embodiment, the streaming step of the LBM may assume that the fluid flows equally in all directions (except for boundaries where it is reflected). However, flow through an inhomogeneous media such as paper is not uniform; that is, variations in the orientation and density of paper fibers may create pockets and barriers that encourage or impede the flow in different directions. In one embodiment, this effect may be simulated within the LBM by adding a "permeability" term that modulates the streaming step. The streaming equation modified with the permeability term may be represented as Equation 9:

$$f_i^*(x+e_i,t+dt) = kf_i(x+e_i,t) + (1-k)f_i(x,t) + F_i(x,t) \qquad (9)$$

where k is the average of the blocking coefficient at x and $x+e_i$. As surface flow is unimpeded, it can be achieved by setting k=0.

In one embodiment, surface tension may be an important component of surface flow in the simulation of paint. Surface tension is a property of the surface of fluids that may cause droplets to bead up or form spheres on some surfaces. The pressure due to surface tension may be computed as Equation 10:

$$p_s = -\gamma \kappa n \qquad (10)$$

where $p_s(x, t)$ is the pressure, γ is the surface tension of the fluid, κ(x, t) is the mean curvature of the surface, and n(x, t) is the normal of the surface. In one embodiment, κ may be computed as Equation 11:

$$\kappa = \frac{1}{2A}\Delta \qquad (11)$$

where A is the surface area of a patch, and Δ(x, t) is the 5-tap discrete Laplacian operator applied to the height field. The force from surface tension, $F_s(x, t)$, may be represented as the pressure times the area in Equation 12:

$$F_s = p_s A \qquad (12)$$

In one embodiment, viscoelasticity may be an important component of surface flow in the simulation of paint. For example, viscoelasticity may allow oil paints to retain their texture. Therefore, viscoelastic forces may be computed and explicitly added to the LBM. The viscoelastic force may be the result of strain on the fluid. Strain may be computed by tracking three parameters during the evolution of the fluid, $\delta_x$, $\delta_y$, and $h_0$. Two parameters $\delta_x$ and $\delta_y$ may represent the shear deformation of the fluid, and $h_0$ may represent the rest height of the fluid. The shear deformation may be determined by how much the fluid has moved away from its rest position, in the xy plane. For each grid cell, the strain ϵ may be computed as Equation 13:

$$\epsilon = \sqrt{\frac{1}{h}(3\delta_x^2 + 3\delta_y^2 + (h-h_0)^2)} \qquad (13)$$

The deformation may be updated as Equations 14 and 15:

$$s = \begin{cases} y/\epsilon & y < \epsilon \\ 1 & \text{otherwise} \end{cases} \qquad (14)$$
$$\delta(x, t+dt) = s(\delta(x, t) + u(x, t))$$
$$h_0(x, t+dt) = h(x, t) + s(h_0(x, t) - h(x, t)) \qquad (15)$$

As shown in Equations 14 and 15, if the strain (ϵ) is less than the yield (y), then the deformation may be integrated normally, but if ϵ is greater than y, then the deformation may be scaled down to reduce the strain. Thus, for large deformations, the fluid may still flow in a plastic manner, but for small deformations, the fluid may maintain its original shape. The resulting force from the deformation parameters may be computed as Equation 16:

$$F_v = -\frac{G}{h}\langle \delta_x, \delta_y, h_0 - h \rangle \qquad (16)$$

where G is the shear modulus of the material (i.e., the coefficient that controls how strain is related to stress).

As will be described in greater detail below, the paint simulation techniques discussed above may be augmented in various embodiments. In one embodiment, a free surface boundary may be included in the shallow water LBM. In one embodiment, surface tension and viscoelasticity may be incorporated as body forces. In one embodiment, a viscous drag term may be included in the LBM, e.g., to create high viscosity flows without requiring more iterations per second. In one embodiment, the simulation may include the simultaneous simulation of both surface flow and media flow on the same canvas using the same salver. In one embodiment, the simulation may include the simultaneous simulation of various paint types such as watercolor paint and oil paint on the same canvas using the same solver. In one embodiment, the shallow water, viscoelastic LBM may be implemented on the GPU for real-time performance at high resolution.

In one embodiment, a free surface boundary may be included in the shallow water LBM. The simulation of portions of the canvas with and without paint may be permitted by the simulation of a free surface boundary. In 2D or 3D simulations, a free boundary is the isocontour (2D) or isosurface (3D) that represents the interface between fluid and air, along which boundary conditions must be applied. In the 2.5D simulation described herein, the free boundary may comprise an isocontour that represents the boundary of wet canvas to dry canvas. Propagation of this boundary may be performed in an ad-hoc manner by allowing a cell with a height of fluid greater than a threshold to spill-over into neighboring cells, thereby wetting them. Therefore, in addition to the other parameters of the LBM, a separate state of wetness of each cell may also be tracked as part of the simulation.

In one embodiment, surface tension and viscoelasticity may be incorporated in the paint simulation. In one embodiment, the surface tension and viscoelasticity may be incorporated into the LBM as body forces. Body forces may be incorporated into the LBM in two ways. First, the body forces may be incorporated by computing a new fluid velocity after the streaming step as represented in Equation 17:

$$u' = u + \frac{1}{2h}F \qquad (17)$$

Second, the body forces may be incorporated as a modification to the collision operator as represented in Equation 18:

$$\Omega'_i = -\frac{1}{\tau}(f_i^* - f_i^{eq}) + CF_i \qquad (18)$$

where C is a coefficient. For a body force computed per-cell, a modification of Equation 18 may be used which employs 5-tap central differencing to compute the actual $F_1$ included in the collision step [14]. The modification of Equation 18 is represented by Equations 19 and 20:

$$F_i^*(x, t) = \frac{1}{2}(F_i(x, t) + F_i(x + e_i, t)) \qquad (19)$$

$$\Omega'_i = -\frac{1}{\tau}(f_i^* - f_i^{eq}) + CF_i^* \qquad (20)$$

That is, the force applied in direction i is the average of the force at the cell and the force in the cell along the i direction.

Figure 2:
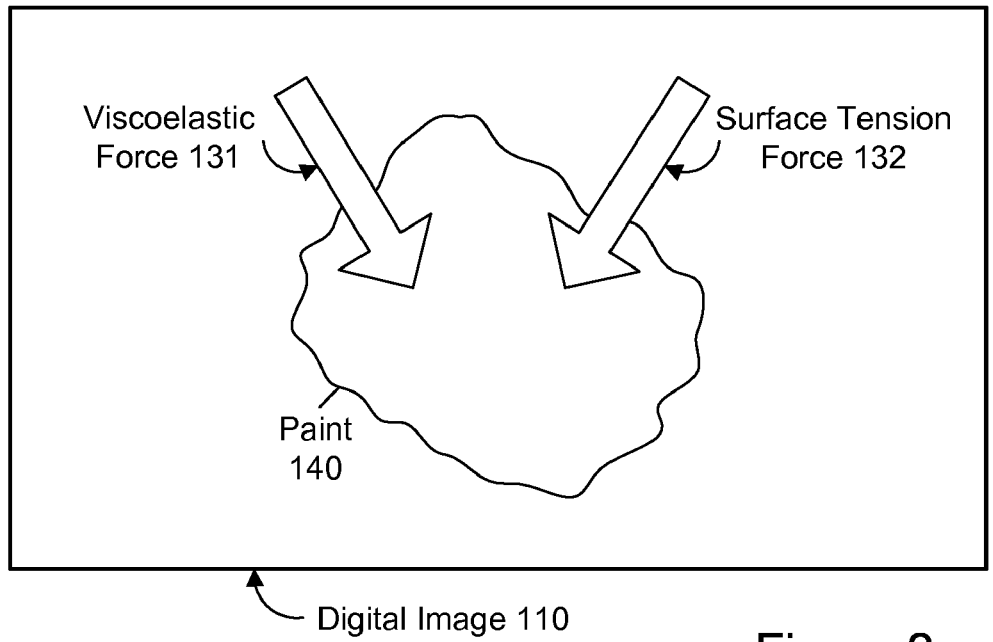
FIG. 2 illustrates the simulation of viscoelasticity and surface tension in the same canvas according to one embodiment.

In one embodiment, instead of modifying the LBM to include the effects of surface tension and viscoelasticity at the fluid particle level, surface tension and viscoelasticity may be incorporated into the simulation as body forces. This manner of incorporation may allow for simpler implementation and integration of these forces while generating plausible results. FIG. 2 illustrates the simulation of a viscoelastic force 131 and a surface tension force 132 on paint 140 in the same canvas according to one embodiment. Although the viscoelastic force 131 and the surface tension force 132 are shown as separate forces for purposes of illustration, the effects of both the viscoelastic force 131 and the surface tension force 132 may be determined using a single framework as shown in Equations 17-20.

In one embodiment, a viscous drag term may be included in the LBM. The viscous drag term may be used to create high viscosity flows without requiring more iterations per second. In the LBM, fluid viscosity may be controlled by adjusting the relaxation parameter (τ) in the collision operator. However, modifying the relaxation parameter to increase viscosity may also reduce the necessary timestep for the simulation, thereby increasing the number of LBM iterations needed to simulate the same amount of time as for lower viscosity fluids. To avoid this penalty, the relaxation parameter may be kept constant throughout the simulation, and the viscosity may be adjusted by incorporating a variable viscous drag term into the fluid velocity as shown in Equation 21:

$$u^n = \left(1 - \frac{v}{h}\right)u' \qquad (21)$$

where v is the viscous drag coefficient. This change may be made to the fluid velocity before the collision step is executed.

Figure 3:
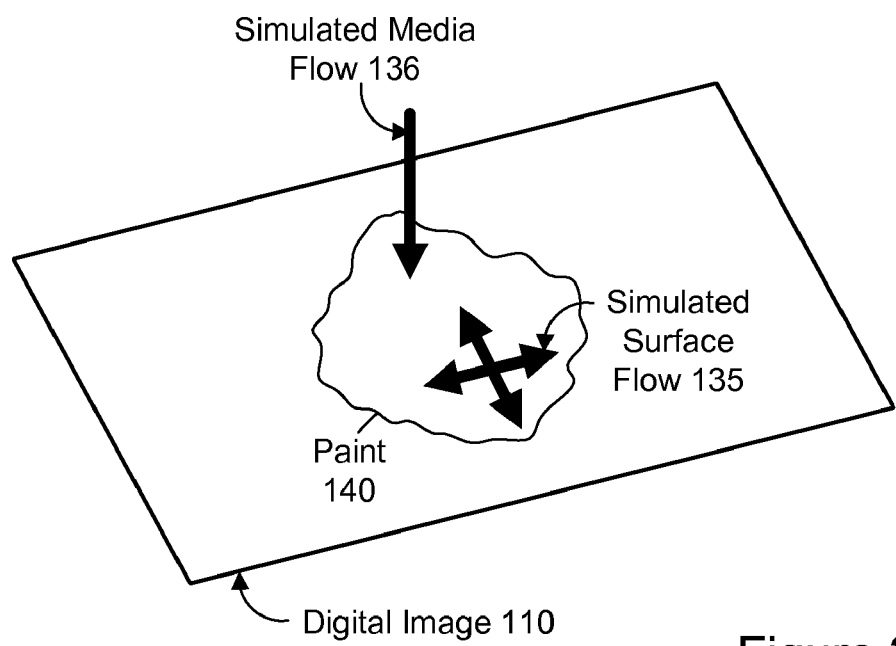
FIG. 3 illustrates the simulation of surface flow and media flow in the same canvas according to one embodiment.

In one embodiment, the simulation may include the simultaneous simulation of various paint types such as watercolor paint and oil paint on the same canvas using the same solver. In one embodiment, the simulation may include the simultaneous simulation of both surface flow and media flow on the same canvas using the same solver. FIG. 3 illustrates the simulation of surface flow 135 and media flow 136 for paint 140 in the same canvas according to one embodiment. In one embodiment, the simulation may support different fluid properties across the domain at the same time.

To support different fluid properties across the domain, the fluid properties that define the motion of the fluid may be tracked. The fluid properties to be tracked may include viscosity, surface tension, yield, and shear modulus. These four values may be stored per-cell of the simulation. Instead of using global constants for the fluid properties, the four values may be read per-cell in the LBM iteration. So that the fluid properties track the motion of the fluid, these values may then be advected by the velocity field.

In one embodiment, it is uncommon for paint fluids to exhibit both surface flow and media flow as the same position and time. In other words, a droplet of watercolor paint may first sit on the surface of the canvas media, during which time it exhibits surface flow; as it is absorbed by the canvas, it will switch to exhibiting media flow. Therefore, the flow state of the fluid (as surface flow or media flow) may be tracked per-cell. Different parameters of the LBM may be used for simulating either surface flow or media flow. To support continuous combinations (ψ) of surface flow and media flow rather than a binary selection, the surface and media LBM flows may both be computed for a cell. The final results may be interpolated between the two using ψ.

Figure 4:
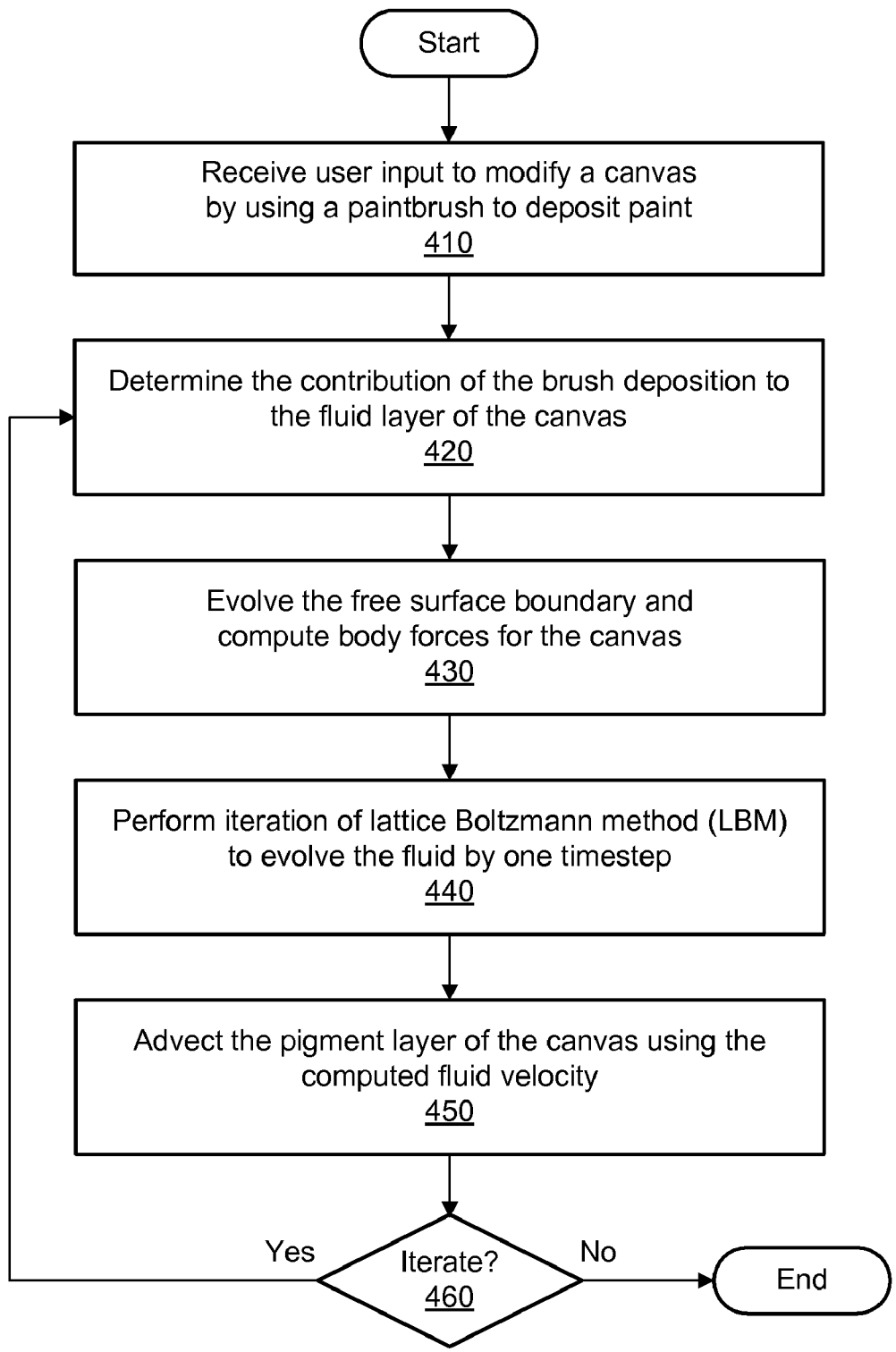
FIG. 4 is a flowchart illustrating a method for simulating paint behavior according to one embodiment.

As discussed above, the LBM fluid simulation technique may be amended to solve the shallow water wave equations with a free surface boundary and the incorporation of surface tension and viscoelastic forces. FIG. 4 is a flowchart illustrating a method for simulating paint behavior according to one embodiment. As shown in 410, user input may be received to modify an image by applying paint. For example, the user input may comprise a selection of a simulated paint type (e.g., watercolor, oil paint, etc.). The user input may further comprise a selection of a paint color using any suitable techniques for selecting a color (e.g., a color wheel, manual entry of color values, etc.). The color may comprise a mix of colors or a pattern rather than a single homogeneous color. The user input may additionally comprise one or more locations (e.g., pixels) within the canvas that is desired to be painted. For example, the user may stroke the canvas with a particular brush to indicate the desired locations of the canvas.

The behavior of the paint on the canvas may be simulated as shown in 420 through 460. The image may be modified based on the results of the paint behavior simulation operations shown in 420 through 460. As shown in 420, for those pixels selected in 410, the contribution of the brush deposition to the fluid layer may be determined. As shown in 430, the free surface boundary may be evolved, and body forces may be computed for the entire canvas. As shown in 440, the LBM may be iterated to evolve the fluid one timestep. As shown in 450, the computed fluid velocity may be used to advect the pigment layer. The operations shown in 430, 440, and 450 may be iterated continuously as shown in 460. In one embodiment, the operations shown in 430, 440, and 450 may be iterated continuously even when no brush stroke is occurring to allow the fluid to continue to evolve realistically in real-time. For example, after the user has made a stroke with a wet brush, the water and pigment will continue to be absorbed and diffused by the canvas even though the brush is no longer depositing. In one embodiment, the operation shown in 410 may also be iterated while additional user input (e.g., further application of paint using a brush) continues to be received.

Figure 7:
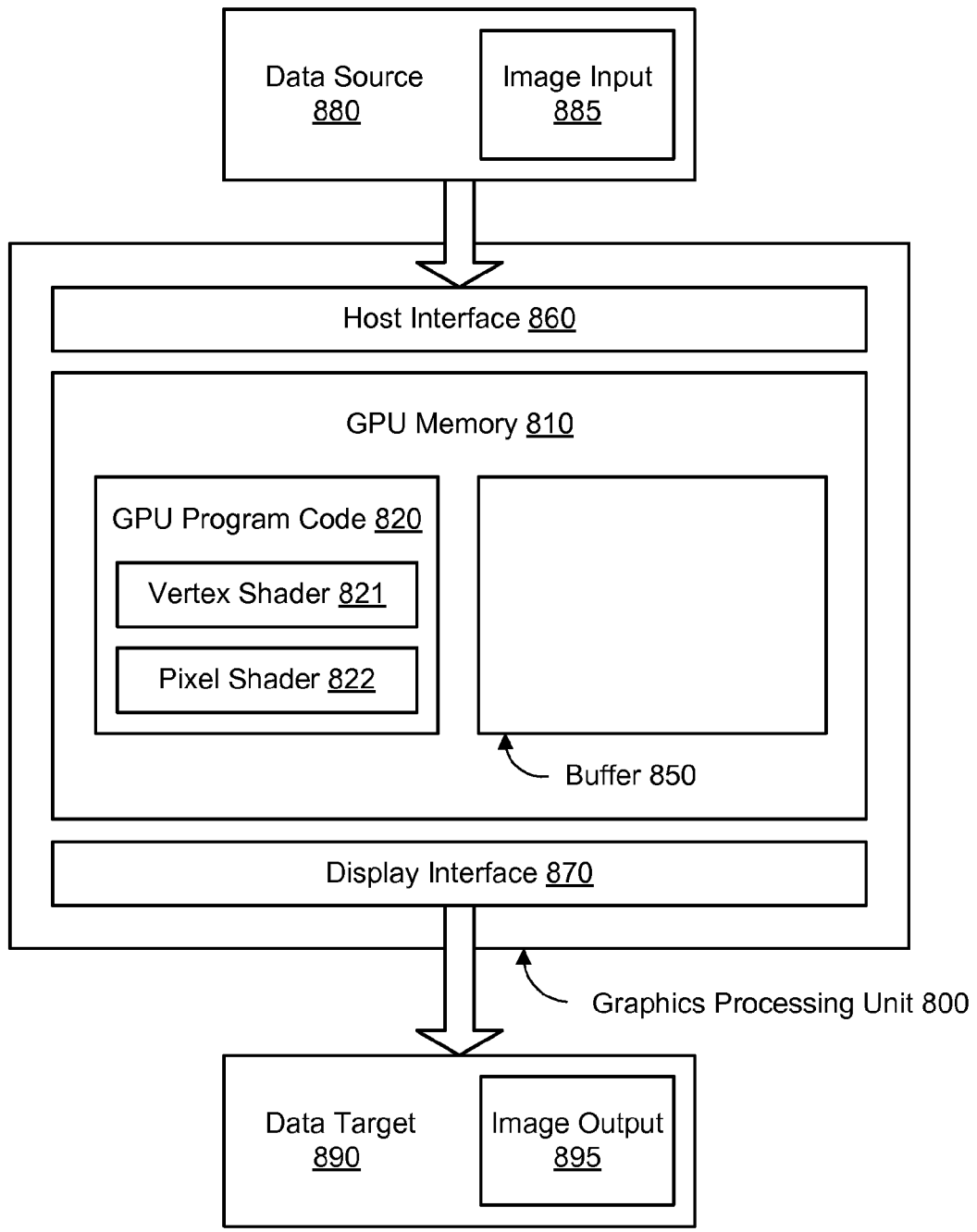
FIG. 7 is a block diagram illustrating one embodiment of a graphics processing unit (GPU) that is configured for use with the systems, methods, and media for paint simulation.

In one embodiment, the shallow water (2.5D) and viscoelastic LBM may be implemented on the GPU for real-time performance at high resolution. A suitable GPU 800 is illustrated in FIG. 7. To take advantage of GPU acceleration, the paint behavior simulation may be implemented as a series of rendering passes (e.g., in OpenGL) over textures that store the variables in the fluid simulation state. Each rendering pass may be performed by binding to the input textures, attaching to a frame buffer object (FBO) with output textures bound as targets, binding to a fragment shader 822 that implements the computations, and then rendering a single quad that covers the simulation area with a one-to-one mapping of grid cells to pixels. In this manner, the fragment shader 822 may be viewed as a function that is called to process an individual cell.

In one embodiment, fluid simulation data may be stored in textures on the GPU as follows. A texture named "bins0" which stores the horizontal and vertical bins may include the values $\langle f_1, f_2, f_3, f_4 \rangle$. A texture named "bins1" which stores the diagonal bins may include the values $\langle f_5, f_6, f_7, f_8 \rangle$. A texture named "macro" which stores the height, velocity, and flow type may include the values $\langle h, u_x, u_y, \psi \rangle$. A texture named "deform" which stores the viscoelastic deformation may include the values $\langle \delta_x, \delta_y, h_0, - \rangle$. A texture named "force" which stores the sum of external forces may include the values $\langle F_x, F_y, F_z, - \rangle$. A texture named "props" which stores the fluid properties may include the values $\langle v, \gamma, y, G \rangle$. A texture named "pigment" which stores the paint color at a pixel may include the values $\langle C_r, C_g, C_b, - \rangle$.

The brush deposition as shown in 420 may be performed as follows in one embodiment. During timesteps when the brush strokes the canvas, the contribution of the brush's fluid to the fluid layer may be computed for each pixel the brush touches. Some amount of brush liquid is deposited, and the brush's motion may have an associated velocity. The new fluid state may be computed as indicated in Equation 22:

$$f_i' = (1-\alpha)f_i + \alpha f_i^{eq}(h+b_h, b_u) \tag{22}$$

where $b_h$ is the amount of fluid added by the brush, $b_u$ is the velocity of the brush (which is assumed to override the inertial velocity of the fluid), and $\alpha$ is a user-parameter that determines how much the brush's deposition influences the fluid simulation, to allow for brushes that have variable effect across the stroke (e.g. a Gaussian blob brush, where center pixels have $\alpha$ of 1, which falls off radially to 0 at the perimeter). The deformation parameters may be initialized to 0, and the pigment may be updated to include a mix of the newly added color, weighted by h and $b_h$, as indicated in Equation 23:

$$C' = (1-\alpha)C + \alpha \frac{hC + b_h b_C}{h + b_h} \tag{23}$$

where $b_C$ is the color of the pigment deposited by the brush.

The free surface evolution as shown in 430 may be performed as follows in one embodiment. The free surface may be defined implicitly as the edge between grid cells that have some fluid and grid cells that have no fluid. In one embodiment, cells can be one of three states: dry, moist, and wet. A dry cell contains no fluid and fluid cannot flow into it; they are marked by setting h to −1. A moist cell contains some fluid (e.g., between 0 and a threshold); fluid can flow into and out of moist cells. Wet cells are those with h greater than the threshold; fluid can flow into and out of them, and they make adjacent dry cells moist. In this manner, cells become moist during deposition, and as fluid flows into them, they become wet. In turn, these cells moisten the neighboring dry cells, which fluid then flows into. This process may repeat until the fluid levels are below the threshold everywhere. In this step, for each cell, the neighboring cells are examined; if any are above the threshold, or if the current cell is already moist, then the current cell is set to moist, or else it is dry (e.g., all bins set to −1). In one embodiment, the updated bins0 and bins1 textures are then written.

The force computation as shown in 430 may be performed as follows in one embodiment. The sum of forces per cell may be as initialized as zero. Surface tension may be computed via Equation 12. The h of neighboring cells may be sampled to compute the Laplacian and normal, and the force may be added to the force accumulator. Viscoelastic shear forces may be computed via Equation 16 by sampling the deformation parameters of the current cell. These forces are also added to the force accumulator, and the sum may be output in the force texture.

The LBM iteration as shown in 440 may be performed as follows in one embodiment. The streaming and collision steps of the LBM may both be done in a single shader. In the streaming step, for each cell, the neighbors may be sampled to determine what is streamed into each bin of the current cell. If the neighbor in any direction is a dry cell, then that direction is a boundary and the no-slip boundary condition is used; that is, the bin is filled with the reflection of the cell's original state. Once the streaming is done, the macroscopic properties of the fluid, h and u, may be computed. The value u may be updated by body forces and viscous drag, as shown in Equations 17 and 21 respectively.

The collision step may be computed as described in connection with Equation 8, with the incorporation of body forces as described in connection with Equations 17-20. The accumulated body forces for a cell may be sampled from the force texture. Once the collision step is done, the viscoelastic deformation parameters may be sampled and updated according to the fluid velocity.

If the cell was originally dry (e.g., as determined at the beginning of the step), then its outputs may all be set to 0 because no fluid flow occurs in dry cells. Otherwise, the updated bins, macroscopic properties, and viscoelastic deformation parameters may be written out to the bins1, bins2, macro, and deform textures, respectively.

In one embodiment, cell dryness may be handled in this manner because the LBM iteration process is typically memory bound rather than compute bound. Therefore, reducing the number of passes through all the data may be desirable in comparison to reducing the number of computations done per cell. By doing the same computations for all cells and then writing results only for dry cells, the number of passes through the data may be reduced. On the other hand, for a GPU having memory bandwidth that is improved relative to its computational power, additional passes may be desirable. For example, to avoid computing dry cells, a separate step may measure which cells were dry or not, and the results of that step may be used to control subsequent steps.

The advection as shown in 450 may be performed as follows in one embodiment. Once the new fluid macroscopic parameters are output as shown in 440, the parameters may be used to update the pigment layer. For each cell, the velocity may be sampled from the macro texture. This velocity may be added in to the cell's texture coordinates, and the new coordinates may be used to sample the four nearest cells in the pigment texture. The height values for these cells may be sampled from the macro texture. The height values may be used to compute the weighted sum of the pigment samples, which may be output as the new color for the current cell.

Figure 5:
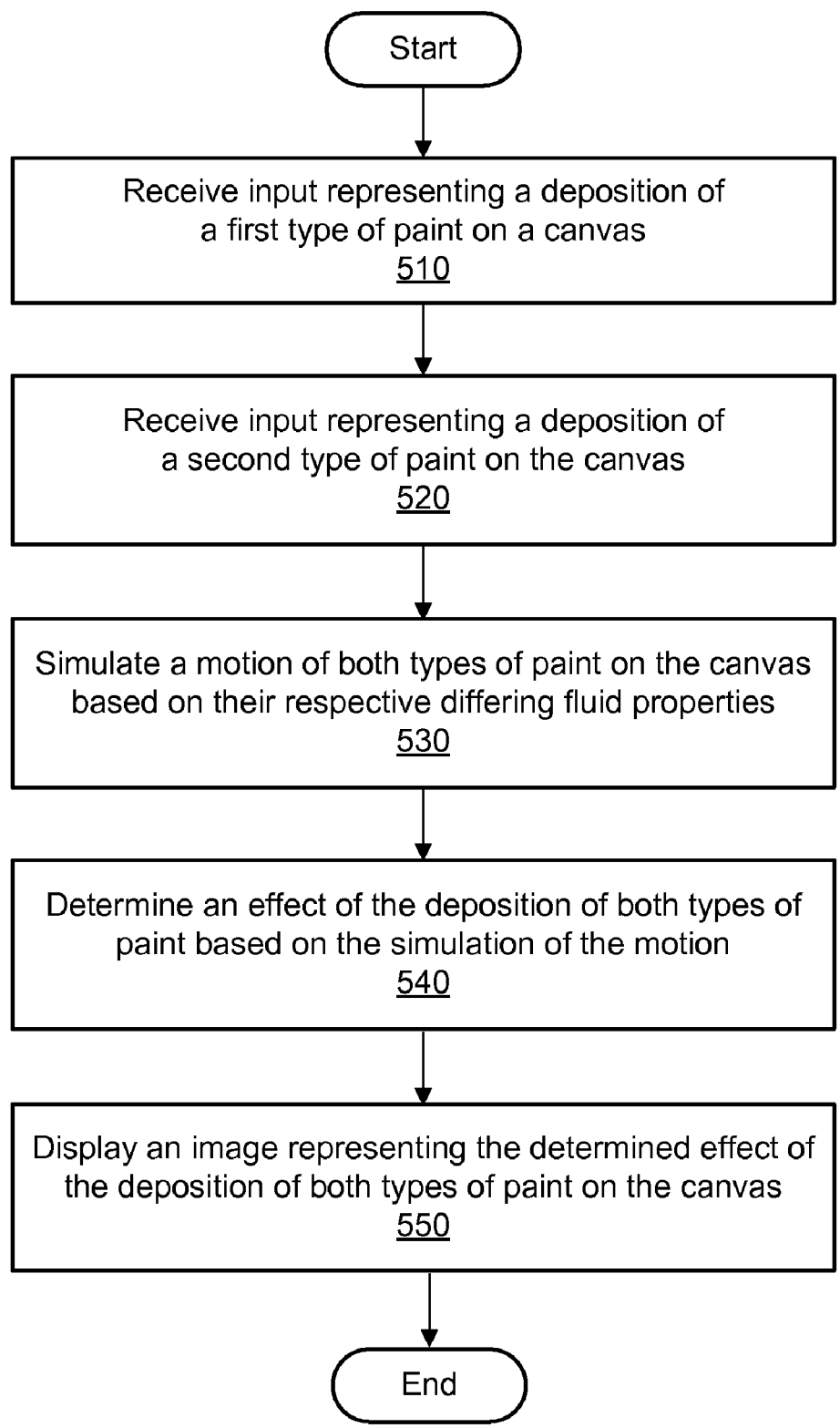
FIG. 5 is a flowchart illustrating a method for simulating paint behavior according to one embodiment.
Figure 6:
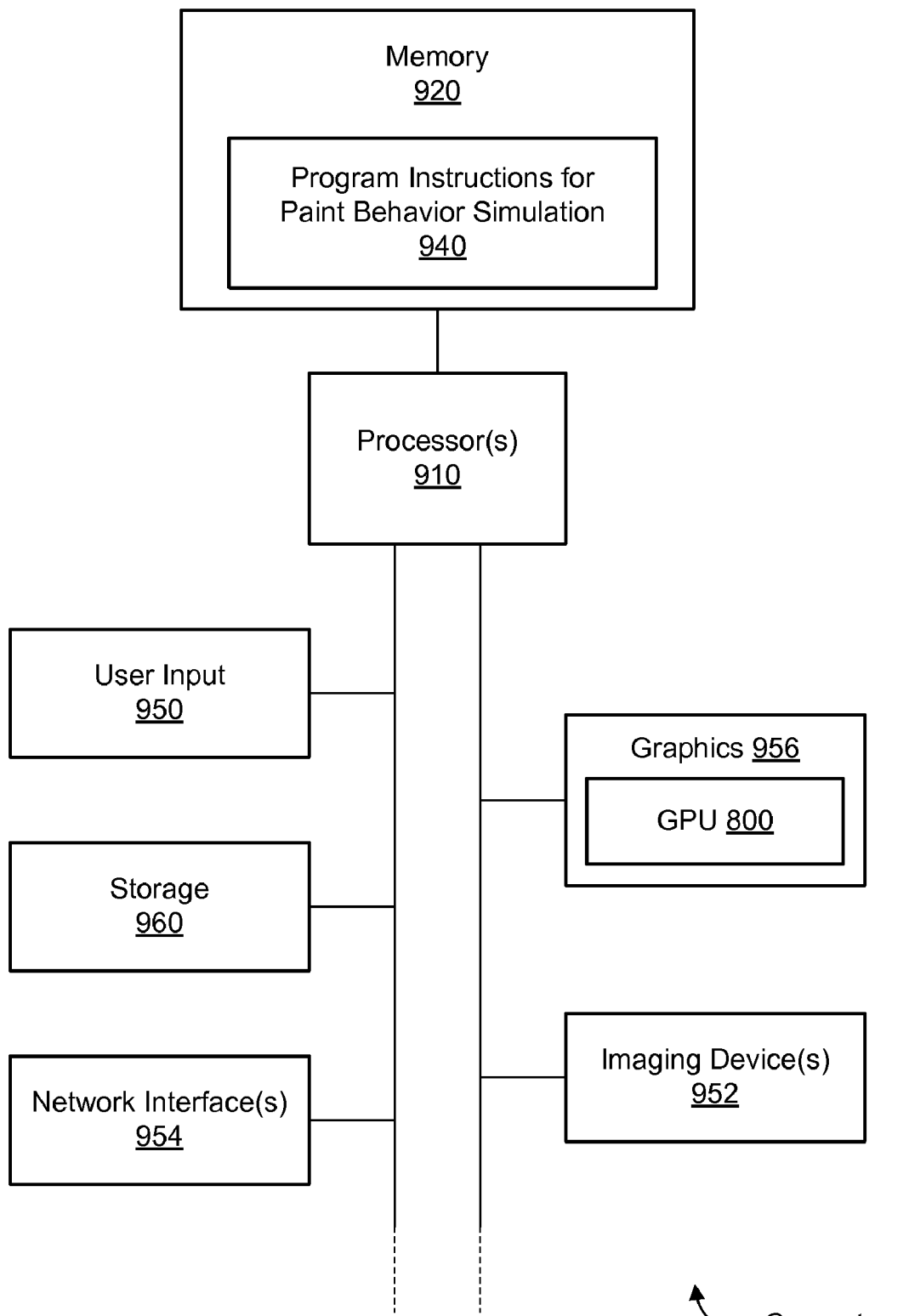
FIG. 6 is a block diagram illustrating constituent elements of a computer system that is configured to implement embodiments of the system, methods, and media for paint simulation.

FIG. 5 is a flowchart illustrating a method for simulating paint behavior according to one embodiment. As shown in 510, input representing a deposition of a first type of paint on a canvas may be received. The first type of paint has a first set of fluid properties. As shown in 520, input representing a deposition of a second type of paint on the canvas may be received. The second type of paint has a second set of fluid properties differing from the first set of fluid properties. For example, each set of fluid properties may comprise a respective viscosity and a respective surface tension. Other fluid properties may comprise yield and shear modulus.

As shown in 530, a motion of the first type of paint and a motion of the second type of paint on the canvas may be simulated. The motion of the first type of paint on the canvas is dependent on the first set of fluid properties, and the motion of the second type of paint on the canvas is dependent on the second set of fluid properties. The motion of the second type of paint may differ from the motion of the first type of paint due to the differences in the respective fluid properties. For example, simulating the motion of the first type of paint may comprise simulating a motion of a watercolor, and simulating the motion of the second type of paint may comprise simulating a motion of an oil paint. In one embodiment, the motion of the first type of paint and the motion of the second type of paint may be simulated simultaneously on the same canvas. In one embodiment, simulating the motion may comprise simulating a surface flow and a media flow on the canvas. Both the surface flow and the media flow may be simulated for at least one of the types of paint.

As shown in 540, an effect of the deposition of the first type of paint and the second type of paint on the canvas may be determined. The determined effect may be dependent on the simulated motion of the first type of paint and the simulated motion of the second type of paint on the canvas. As shown in 550, an image representing the effect of the deposition of the first type of paint and the second type of paint may be displayed (e.g., on a display device).

In one embodiment, viscoelastic forces may be computed as follows. The elastic stress σ at any point in a body is a rank 2 tensor with units of pressure, which characterizes the internal restoring forces in the body. Assuming linear elasticity, the stress is proportional to the elastic strain ϵ, which is a dimensionless tensor characterizing deformation. For a purely elastic body, ϵ may be thought of as the differential deformation from the body's rest shape. Of course, a viscoelastic fluid may also flow and lose its shape.

Because the elastic strain ϵ is symmetric, it has six independent components, as shown in Equation 24:

$$\epsilon = \begin{bmatrix} \epsilon_{xx} & \epsilon_{xy} & \epsilon_{xz} \\ \epsilon_{xy} & \epsilon_{yy} & \epsilon_{yz} \\ \epsilon_{xz} & \epsilon_{yz} & \epsilon_{zz} \end{bmatrix} \quad (24)$$

The longitudinal stretch components are $\epsilon_{xx}$, $\epsilon_{yy}$, and $\epsilon_{zz}$, and the shear components are $\epsilon_{xy}$, $\epsilon_{xz}$, and $\epsilon_{yz}$. If the material is assumed to be incompressible, then Equation 25 is the case:

$$\epsilon_{xx} + \epsilon_{yy} + \epsilon_{zz} = 0 \quad (25)$$

In other words, ϵ is a traceless tensor. However, the stress σ is not necessarily traceless, and so the general relation is indicated by Equation 26:

$$\sigma = pI + G\epsilon \quad (26)$$

where p is a pressure component and G is the shear modulus of the material. The pressure p may depend on external or non-bulk forces such as gravity and surface tension, and the pressure p is independent of ϵ itself.

In one embodiment, the value of the elastic strain tensor ϵ may be computed by integrating the strain rate over time. The total strain rate which the material undergoes is given directly by the velocity field, as indicated by Equation 27

$$\epsilon' = \frac{1}{2}(\nabla u^T + (\nabla u^T)^T) \quad (27)$$

where u is the velocity field and $\nabla u^T$ is its Jacobian tensor. However, Equation 27 does not directly give the change in elastic strain, because plastic flow may occur if the yield point is exceeded. Therefore, the rate of change of elastic strain is indicated by Equation 28:

$$\frac{d\epsilon}{dt} = \frac{1}{2}(\nabla u^T + (\nabla u^T)^T) - \alpha\left(\frac{\epsilon}{\|\epsilon\|}\right)\max(0, \|\epsilon\| - \gamma) \quad (28)$$

where γ is the yield strain, $\|\epsilon\|$ is the second invariant of the traceless tensor ϵ, and α is the elastic decay rate. The computation may be simplified by ignoring the second term and simply constraining $\|\epsilon\| \leq \gamma$ after integration; this effectively corresponds to allowing α to go to infinity.

In the shallow fluid model, at each grid cell is a column of fluid of known height h and velocity u. Because this model already relies on some simplifying assumptions on the motion of the fluid, these assumptions may be used to define a simplified model of the elastic strain.

A first assumption may be made that, since the bottom of the fluid layer is anchored to the bed, there is much greater variation of velocity in the normal (z) direction than tangentially. Therefore, three components of the strain tensor may be neglected: the three components which do not involve z, i.e. the tangential stretching $\epsilon_{xx}$ and $\epsilon_{yy}$, and the in-plane shear $\epsilon_{xy}$.

A second assumption may be made that the fluid velocity varies linearly with height from 0 at the bed to u at the top. Therefore, the shear strain rate may be given by Equations 29 and 30:

$$\epsilon_{xz}' = u_x/h \quad (29)$$

$$\epsilon_{yz}' = u_y/h \quad (30)$$

Change in $\epsilon_{zz}$ may be due to the vertical motion of the fluid, which only occurs due to changes in the height. Equation 31 is thus the case:

$$\epsilon_{zz}' = h'/h \quad (31)$$

Furthermore, assuming that h' is small compared to |u|, Equations 32 and 33 follow:

$$\frac{d}{dt}(h\epsilon_{xz}) = u_x - \epsilon_{xz}h' \approx u_x \quad (32)$$

$$\frac{d}{dt}(h\epsilon_{yz}) = u_y - \epsilon_{yz}h' \approx u_y \quad (33)$$

Equation 34 follows:

$$\epsilon_{zz} = \ln(h/h_0) \approx (h-h_0)/h_0 \quad (34)$$

for some constant $h_0$.

In one embodiment, the quantities $\delta_x = h'_{xz}$, $\delta_y = h'_{yz}$, and $h_0$ have simple physical interpretations. The quantities $\delta_x$ and $\delta_y$ represent the shear displacement of the top of the fluid column, and the quantity $h_0$ represents the column's rest height. In embodiments of the fluid simulation system and method described herein, it may be simpler to track these quantities than to track the strain tensor itself. The quantities $\delta_x$ and $\delta_y$ may be found by integrating $u_x$ and $u_y$ over time, while $h_0$ is constant for a given fluid column. The values may be advected at each timestep to account for the motion of the fluid.

Given these values, the strain $\epsilon$ is known. The strain $\epsilon$ may be used to apply additional forces to the LBM to account for the elastic behavior of the fluid. The additional stress in 3D caused by the shear strain is represented using Equation 35:

$$\sigma = \begin{bmatrix} \frac{1}{2}G\epsilon_{zz} & 0 & -G\epsilon_{xz} \\ 0 & \frac{1}{2}G\epsilon_{zz} & -G\epsilon_{yz} \\ -G\epsilon_{xz} & -G\epsilon_{yz} & -G\epsilon_{zz} \end{bmatrix} \quad (35)$$

using incompressibility and the assumption that the effect of $\epsilon_{xx}$, $\epsilon_{yy}$, and $\epsilon_{xy}$ is negligible. Because the fluid cannot move in the z direction, the last row of the tensor may be ignored. In one embodiment, the effect of $\sigma_{xx}$ and $\sigma_{yy}$ is exactly that of a pressure $p^{el} = G\epsilon_{zz}/2$. Therefore, the effect of $\sigma_{xx}$ and $\sigma_{yy}$ may be incorporated into the LBM as an additional pressure term. The remaining two components $\sigma_{xz}$ and $\sigma_{yz}$ form an in-plane shear stress which may be represented as an external force $F^{el} = [-G\epsilon_{xz}, -G\epsilon_{yz}]^T$.

For each grid cell, the values of the elastic variables $\delta_x$ and $\delta_y$ as well as $h_0$ may be tracked. The values are of $\delta_x$ and $\delta_y$ are initially zero, and $h_0$ may be initialized to the fluid height. In the beginning of each iteration, yielding may be accounted for by computing $\|\epsilon\|$. If $\|\epsilon\|$ exceeds $\gamma$, the values of the elastic variables may be updated so that $\epsilon \leftarrow (\gamma/\|\epsilon\|)\epsilon$. In, the collision step of the LBM, the elastic pressure $p^{el}$ may be computed and incorporated as an additional pressure along with the gravitational pressure. The vertical component of the surface tension force may also be included in the collision step. In the streaming step, the elastic shear stress $F^{el}$ and the horizontal component of the surface tension may be included as external forces. As the LBM bins are updated from neighboring cells in the streaming step, the elastic variables may be updated by advection at the same time.

FIG. 7 is a block diagram illustrating constituent elements of a computer system 900 that is configured to implement embodiments of the systems and methods described herein. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a graphics processing unit (GPU) 800. Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the techniques described herein may be partly or fully resident within the memory 920 at the computer system 900 at any point in time. For example, portions of the digital image editing program 100 and its constituent elements and data (e.g., the paint simulation functionality 130) may be stored in the memory 920. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. The computer system 900 may also include numerous elements not shown in FIG. 7, as illustrated by the ellipsis.

FIG. 8 is a block diagram illustrating one embodiment of a graphics processing unit (GPU) 800 configured for use with the systems, methods, and media described herein. The GPU 800, also referred to herein as a graphics processor, may comprise a dedicated graphics rendering device associated with a computer system. An example of a suitable computer system 900 for use with a GPU is illustrated in FIG. 7. Turning back to FIG. 8, the GPU 800 may include numerous specialized components configured to optimize the speed of rendering graphics output. For example, the GPU 800 may include specialized components for rendering three-dimensional models, for applying textures to surfaces, etc. For the sake of illustration, however, only a limited selection of components is shown in the example GPU 800 of FIG. 8. It is contemplated that GPU architectures other than the example architecture of FIG. 8 may be usable for implementing the techniques described herein. The GPU 800 may implement one or more application programming interfaces (APIs) that permit programmers to invoke the functionality of the GPU. Suitable GPUs may be commercially available from vendors such as NVIDIA Corporation, ATI Technologies, and others.

The GPU 800 may include a host interface 860 configured to communicate with a data source 880 (e.g., a communications bus and/or processor(s) 910 of a host computer system 900). For example, the data source 880 may provide image input data 885 and/or executable program code to the GPU 800. In some embodiments, the host interface 860 may permit the movement of data in both directions between the GPU 800 and the data source 880. The GPU 800 may also include a display interface 870 for providing output data to a data target 890. The data target 890 may comprise an imaging device 952 such as a display or printer. For example, if data target 890 comprises a display device 952, the GPU 800 (along with other graphics components and/or interfaces 956) may "drive" the display 952 by providing graphics data at a particular rate from a screen buffer (e.g., the buffer 850).

In one embodiment, the GPU 800 may include internal memory 810. The GPU memory 810, also referred to herein as "video memory" or "VRAM," may comprise random-access memory (RAM) which is accessible to other GPU components. As will be described in greater detail below, the GPU memory 810 may be used in some embodiments to store various types of data and instructions such as input data, output data, intermediate data, program instructions for performing various tasks, etc. In one embodiment, the GPU 800 may also be configured to access a memory 920 of a host computer system 900 via the host interface 860.

In one embodiment, the GPU 800 may include GPU program code 820 that is executable by the GPU 800 to perform aspects of techniques discussed herein. Elements of the image input 885 may be rasterized to pixels during a rendering process including execution of the GPU program code 820 on the GPU 800. Elements of the GPU program code 820 may be provided to the GPU 800 by a host computer system (e.g., the data source 880) and/or may be native to the GPU 800. The GPU program code 820 may comprise a vertex shader 821 and/or a pixel shader 822. A vertex shader 821 comprises program instructions that are executable by the GPU 800 to determine properties (e.g., position) of a particular vertex. A vertex shader 821 may expect input such as uniform variables (e.g., constant values for each invocation of the vertex shader) and vertex attributes (e.g., per-vertex data). A pixel shader 822 comprises program instructions that are executable by the GPU 800 to determine properties (e.g., color) of a particular pixel. A pixel shader 822 may also be referred to as a fragment shader. A pixel shader 822 may expect input such as uniform variables (e.g., constant values for each invocation of the pixel shader) and pixel attributes (e.g., per-pixel data). In generating the image output 895, the vertex shader 821 and/or the pixel shader 822 may be executed at various points in the graphics pipeline.

The GPU memory 800 may comprise one or more buffers 850. Each buffer 850 may comprise a two-dimensional array of pixel data (e.g., color values) and/or pixel metadata (e.g., depth values, stencil values, etc.). For example, the GPU memory 810 may comprise an image buffer 850 that stores intermediate or final pixel values generated in the rendering process. In one embodiment, the image buffer 850 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In one embodiment, the image buffer 850 may comprise a multi-sampling buffer usable for anti-aliasing.

In various embodiments, the elements shown in FIGS. 4 and 5 may be performed in a different order than the illustrated order. In FIGS. 4 and 5, any of the operations described in the elements may be performed programmatically (i.e., by a computer according to a computer program). In FIGS. 4 and 5, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
receiving input representing a deposition of a first type of paint on a canvas, wherein the first type of paint has a first set of fluid properties;
receiving input representing a deposition of a second type of paint on the canvas, wherein the second type of paint has a second set of fluid properties differing from the first set of fluid properties;
simulating a motion of the first type of paint and a motion of the second type of paint on the canvas, wherein the motion of the first type of paint on the canvas is dependent on the first set of fluid properties, wherein the motion of the second type of paint on the canvas is dependent on the second set of fluid properties, wherein the motion of the second type of paint differs from the motion of the first type of paint, wherein simulating the motion comprises using a lattice Boltzmann method comprising a streaming step and a collision step based on two spatial dimensions and a height field, and wherein the lattice Boltzmann method comprises a fluid formulation using the height field instead of fluid density;
determining an effect of the deposition of the first type of paint and the second type of paint on the canvas, wherein the determined effect is dependent on the simulating the motion of the first type of paint and the motion of the second type of paint on the canvas; and displaying an image representing the effect of the deposition of the first type of paint and the second type of paint on the canvas.

2. The method as recited in claim 1, wherein the first set of fluid properties comprises a first viscosity and a first surface tension, and wherein the second set of fluid properties comprises a second viscosity and a second surface tension.

3. The method as recited in claim 1, wherein simulating the motion of the first type of paint on the canvas comprises simulating a motion of a watercolor on the canvas, and wherein simulating the motion of the second type of paint on the canvas comprises simulating a motion of an oil paint on the canvas.

4. The method as recited in claim 1, wherein simulating the motion of the first type of paint and the motion of the second type of paint on the canvas comprises simulating a surface flow and a media flow on the canvas.

5. The method as recited in claim 1, wherein simulating the motion of the first type of paint on the canvas comprises simulating a surface flow and a media flow on the canvas.

6. The method as recited in claim 1, wherein the motion of the first type of paint and the motion of the second type of paint are simulated simultaneously on the canvas.

7. The method as recited in claim 1, wherein the fluid formulation comprises a Navier-Stokes formulation.

8. The method as recited in claim 1, wherein simulating the motion of the first type of paint and the motion of the second type of paint on the canvas comprises determining a free surface boundary, wherein the free surface boundary comprises an isocontour representing a boundary between a wet portion of the canvas and a dry portion of the canvas.

9. The method as recited in claim 1, wherein simulating the motion of the first type of paint and the motion of the second type of paint on the canvas comprises determining body forces representing viscoelasticity and surface tension.

10. The method as recited in claim 1, wherein simulating the motion of the first type of paint and the motion of the second type of paint on the canvas comprises determining a fluid velocity dependent on a viscous drag term.

11. The method as recited in claim 1, wherein simulating the motion of the first type of paint and the motion of the second type of paint on the canvas comprises executing a shader on a graphics processing unit (GPU).

12. A system, comprising:
one or more processors; and
a memory coupled to the one or more processors and storing program instructions executable by the one or more processors to implement:
receiving input representing a deposition of a first type of paint on a canvas, wherein the first type of paint has a first set of fluid properties;
receiving input representing a deposition of a second type of paint on the canvas, wherein the second type of paint has a second set of fluid properties differing from the first set of fluid properties;
simulating a motion of the first type of paint and a motion of the second type of paint on the canvas, wherein the motion of the first type of paint on the canvas is dependent on the first set of fluid properties, wherein the motion of the second type of paint on the canvas is dependent on the second set of fluid properties, wherein the motion of the second type of paint differs from the motion of the first type of paint, wherein simulating the motion comprises using a lattice Boltzmann method comprising a streaming step and a collision step based on two spatial dimensions and a height field, and wherein the lattice Boltzmann method comprises a fluid formulation using the height field instead of fluid density;

determining an effect of the deposition of the first type of paint and the second type of paint on the canvas, wherein the determined effect is dependent on the simulating the motion of the first type of paint and the motion of the second type of paint on the canvas; and displaying an image representing the effect of the deposition of the first type of paint and the second type of paint on the canvas.

13. The system as recited in claim 12, wherein the first set of fluid properties comprises a first viscosity and a first surface tension, and wherein the second set of fluid properties comprises a second viscosity and a second surface tension.

14. The system as recited in claim 12, wherein simulating the motion of the first type of paint on the canvas comprises simulating a motion of a watercolor on the canvas, and wherein simulating the motion of the second type of paint on the canvas comprises simulating a motion of an oil paint on the canvas.

15. The system as recited in claim 12, wherein simulating the motion of the first type of paint and the motion of the second type of paint on the canvas comprises simulating a surface flow and a media flow on the canvas.

16. The system as recited in claim 12, wherein simulating the motion of the first type of paint on the canvas comprises simulating a surface flow and a media flow on the canvas.

17. The system as recited in claim 12, wherein the motion of the first type of paint and the motion of the second type of paint are simulated simultaneously on the canvas.

18. The system as recited in claim 12, wherein the fluid formulation comprises a Navier-Stokes formulation.

19. The system as recited in claim 12, wherein simulating the motion of the first type of paint and the motion of the second type of paint on the canvas comprises determining a free surface boundary, wherein the free surface boundary comprises an isocontour representing a boundary between a wet portion of the canvas and a dry portion of the canvas.

20. The system as recited in claim 12, wherein simulating the motion of the first type of paint and the motion of the second type of paint on the canvas comprises determining body forces representing viscoelasticity and surface tension.

21. The system as recited in claim 12, wherein simulating the motion of the first type of paint and the motion of the second type of paint on the canvas comprises determining a fluid velocity dependent on a viscous drag term.

22. The system as recited in claim 12, further comprising:
a graphics processing unit (GPU);
wherein simulating the motion of the first type of paint and the motion of the second type of paint on the canvas comprises executing a shader on the GPU.

23. A computer-readable storage medium, storing program instructions computer-executable to implement:
receiving input representing a deposition of a first type of paint on a canvas, wherein the first type of paint has a first set of fluid properties;
receiving input representing a deposition of a second type of paint on the canvas, wherein the second type of paint has a second set of fluid properties differing from the first set of fluid properties;
simulating a motion of the first type of paint and a motion of the second type of paint on the canvas, wherein the motion of the first type of paint on the canvas is dependent on the first set of fluid properties, wherein the motion of the second type of paint on the canvas is dependent on the second set of fluid properties, wherein the motion of the second type of paint differs from the motion of the first type of paint, wherein simulating the motion comprises using a lattice Boltzmann method comprising a streaming step and a collision step based on two spatial dimensions and a height field, and wherein the lattice Boltzmann method comprises a fluid formulation using the height field instead of fluid density;

determining an effect of the deposition of the first type of paint and the second type of paint on the canvas, wherein the determined effect is dependent on the simulating the motion of the first type of paint and the motion of the second type of paint on the canvas; and displaying an image representing the effect of the deposition of the first type of paint and the second type of paint on the canvas.

24. The computer-readable storage medium as recited in claim 23, wherein the first set of fluid properties comprises a first viscosity and a first surface tension, and wherein the second set of fluid properties comprises a second viscosity and a second surface tension.

25. The computer-readable storage medium as recited in claim 23, wherein simulating the motion of the first type of paint on the canvas comprises simulating a motion of a watercolor on the canvas, and wherein simulating the motion of the second type of paint on the canvas comprises simulating a motion of an oil paint on the canvas.

26. The computer-readable storage medium as recited in claim 23, wherein simulating the motion of the first type of paint and the motion of the second type of paint on the canvas comprises simulating a surface flow and a media flow on the canvas.

27. The computer-readable storage medium as recited in claim 23, wherein simulating the motion of the first type of paint on the canvas comprises simulating a surface flow and a media flow on the canvas.

28. The computer-readable storage medium as recited in claim 23, wherein the motion of the first type of paint and the motion of the second type of paint are simulated simultaneously on the canvas.

29. The computer-readable storage medium as recited in claim 23, wherein the fluid formulation comprises a Navier-Stokes formulation.

30. The computer-readable storage medium as recited in claim 23, wherein simulating the motion of the first type of paint and the motion of the second type of paint on the canvas comprises determining a free surface boundary, wherein the free surface boundary comprises an isocontour representing a boundary between a wet portion of the canvas and a dry portion of the canvas.

31. The computer-readable storage medium as recited in claim 23, wherein simulating the motion of the first type of paint and the motion of the second type of paint on the canvas comprises determining body forces representing viscoelasticity and surface tension.

32. The computer-readable storage medium as recited in claim 23, wherein simulating the motion of the first type of paint and the motion of the second type of paint on the canvas comprises determining a fluid velocity dependent on a viscous drag term.

33. The computer-readable storage medium as recited in claim 23, wherein simulating the motion of the first type of paint and the motion of the second type of paint on the canvas comprises executing a shader on a graphics processing unit (GPU).

34. A computer-implemented method, comprising:

executing instructions on a specific apparatus so that binary digital electronic signals representing a deposition of a first type of paint on a canvas are received as input, wherein the first type of paint has a first set of fluid properties;

executing instructions on said specific apparatus so that binary digital electronic signals representing a deposition of a second type of paint on the canvas are received as input, wherein the second type of paint has a second set of fluid properties differing from the first set of fluid properties; and executing instructions on said specific apparatus so that binary digital electronic signals representing a motion of the first type of paint and a motion of the second type of paint on the canvas are determined by a simulation, wherein the motion of the first type of paint on the canvas is dependent on the first set of fluid properties, wherein the motion of the second type of paint on the canvas is dependent on the second set of fluid properties, wherein the motion of the second type of paint differs from the motion of the first type of paint, wherein simulating the motion comprises using a lattice Boltzmann method comprising a streaming step and a collision step based on two spatial dimensions and a height field, and wherein the lattice Boltzmann method comprises a fluid formulation using the height field instead of fluid density; and executing instructions on said specific apparatus so that binary digital electronic signals representing an effect of the deposition of the first type of paint and the second type of paint on the canvas are determined, wherein the determined effect is dependent on the motion of the first type of paint and the motion of the second type of paint on the canvas; and storing an image representing the effect of the deposition of the first type of paint and the second type of paint on the canvas in a memory location of said specific apparatus for later use.

* * * * *